(12) United States Patent
Norman

(10) Patent No.: US 9,232,200 B2
(45) Date of Patent: Jan. 5, 2016

(54) EXTERNAL VEHICLE PROJECTION SYSTEM

(71) Applicant: Devin L. Norman, Demopolis, AL (US)

(72) Inventor: Devin L. Norman, Demopolis, AL (US)

( * ) Notice: Subject to any disclaimer, the term of this patent is extended or adjusted under 35 U.S.C. 154(b) by 325 days.

(21) Appl. No.: 13/888,530

(22) Filed: May 7, 2013

(65) Prior Publication Data

US 2014/0204201 A1 Jul. 24, 2014

Related U.S. Application Data

(60) Provisional application No. 61/754,725, filed on Jan. 21, 2013.

(51) Int. Cl.
*H04N 9/31* (2006.01)
*B60K 35/00* (2006.01)
*G08G 1/16* (2006.01)

(52) U.S. Cl.
CPC *H04N 9/31* (2013.01); *B60K 35/00* (2013.01); *B60K 2350/2052* (2013.01); *B60K 2350/924* (2013.01); *G08G 1/167* (2013.01)

(58) Field of Classification Search
CPC .................................................... G06K 9/007
USPC .......................................... 348/116, 118, 119
See application file for complete search history.

(56) References Cited

U.S. PATENT DOCUMENTS

| | | | | |
|---|---|---|---|---|
| 5,410,346 A * | 4/1995 | Saneyoshi et al. | ............ | 348/116 |
| 7,307,655 B1 * | 12/2007 | Okamoto et al. | .......... | 348/222.1 |
| 7,974,748 B2 * | 7/2011 | Goerick et al. | ................. | 701/28 |
| 8,733,939 B2 * | 5/2014 | Othmer | .......................... | 353/13 |
| 2010/0164702 A1 * | 7/2010 | Sasaki et al. | ................... | 340/438 |
| 2012/0044090 A1 * | 2/2012 | Kahler et al. | ................. | 340/905 |
| 2012/0050138 A1 * | 3/2012 | Sato et al. | ......................... | 345/4 |
| 2013/0038730 A1 * | 2/2013 | Peterson et al. | ............. | 348/148 |
| 2013/0110314 A1 * | 5/2013 | Stieff | ................................ | 701/1 |
| 2013/0231828 A1 * | 9/2013 | Seal | ................................ | 701/36 |

* cited by examiner

Primary Examiner — Paulos M Natnael
(74) Attorney, Agent, or Firm — Dale J. Ream

(57) ABSTRACT

An external projection system for an automobile includes a mounting framework coupled to an exterior portion of an automobile. The projection system includes first and second projectors mounted to the mounting framework and each configured to project an image forwardly away from the automobile. A driver input member is mounted in the passenger area of the automobile and is electrically connected to the projectors, the input member configured to control movement and operation of the projectors. The system includes a processor in data communication with the input member and the projectors, the system including programming by which the processor selectively controls the projectors. The projectors may project indicia such as directional arrows so as to simulate driving toward and overtaking a distant arrow. The system may also include a video player for projecting movies in front of the automobile.

13 Claims, 6 Drawing Sheets

EXTERNAL VEHICLE PROJECTION SYSTEM

REFERENCE TO RELATED APPLICATION

This non-provisional patent application claims the benefit of provisional application Ser. No. 61/754,725 filed on Jan. 21, 2013, titled External Vehicle Projection System.

BACKGROUND OF THE INVENTION

This invention relates generally to image projection systems and, more particularly, to a projection system mounted to the exterior of an automobile and that is configured to project directional indicia upon the roadway so that a user may review directional information while keeping his eyes on the road.

A driver must frequently consider multiple types of data while driving such as vehicle data supplied by dashboard speed or fuel gauges and visual directional data supplied by a global positioning system ("GPS"). Unfortunately, shifting one's eyes from the road to the dashboard may be just as distracting as talking or texting on a cellular phone. In the worst case, a driver may be so distracted that he may be involved in an accident causing injury to himself or others.

Therefore, it would be desirable to have an external projection system for use on an automobile that projects directional indicia directly onto the roadway while driving so that a driver may see and consider this data without ever taking his eyes off the road.

SUMMARY OF THE INVENTION

An external projection system for an automobile according to the present invention includes a mounting framework coupled to an exterior portion of an automobile. The projection system includes first and second projectors mounted to the mounting framework and each configured to project an image forwardly away from the automobile. A driver input member is mounted in the passenger area of the automobile and is electrically connected to the projectors, the input member configured to control movement and operation of the projectors. The system includes a processor in electrical communication with the input member and the projectors, the system including programming by which the processor selectively controls the projectors. The projectors may project indicia such as directional arrows so as to simulate driving toward and overtaking a distant arrow. The system may also include a video player for projecting movies in front of the automobile.

Therefore, a general object of this invention is to provide an external projection system for use on an automobile that selectively projects driving instructions or other vehicle data directly onto a roadway so that a driver may review the data without taking his eyes off the road.

Another object of this invention is to provide a projection system, as aforesaid, that includes a step down procedure that continuously brings directional indicia closer to the automobile as the automobile is moving forward.

Other objects and advantages of the present invention will become apparent from the following description taken in connection with the accompanying drawings, wherein is set forth by way of illustration and example, embodiments of this invention.

DESCRIPTION OF THE PREFERRED EMBODIMENT

Figure 1:
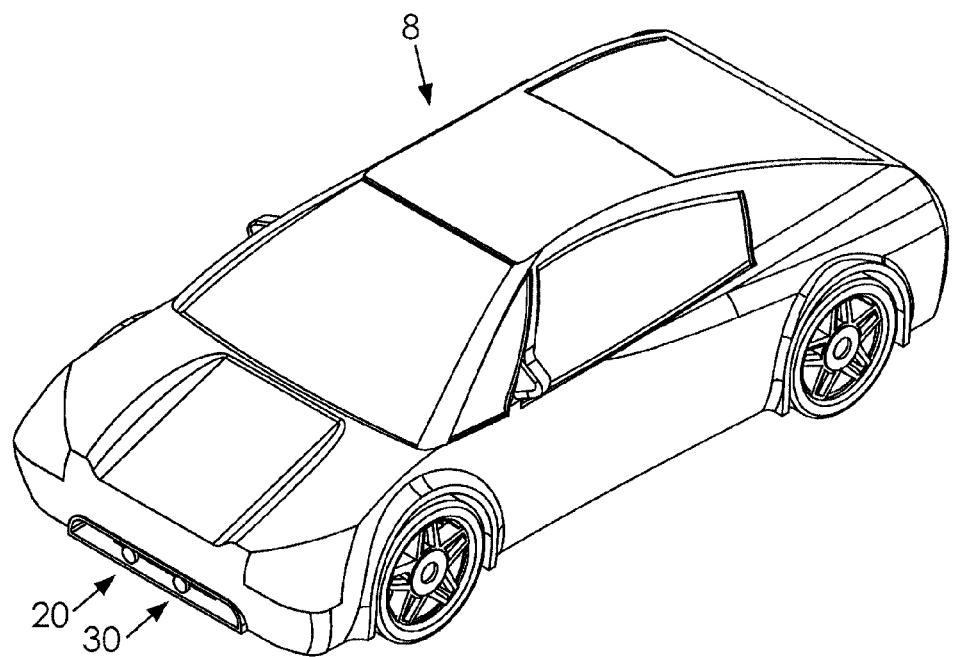
FIG. 1 is a perspective view of an external vehicle projection system according to a preferred embodiment of the present invention.
Figure 2:
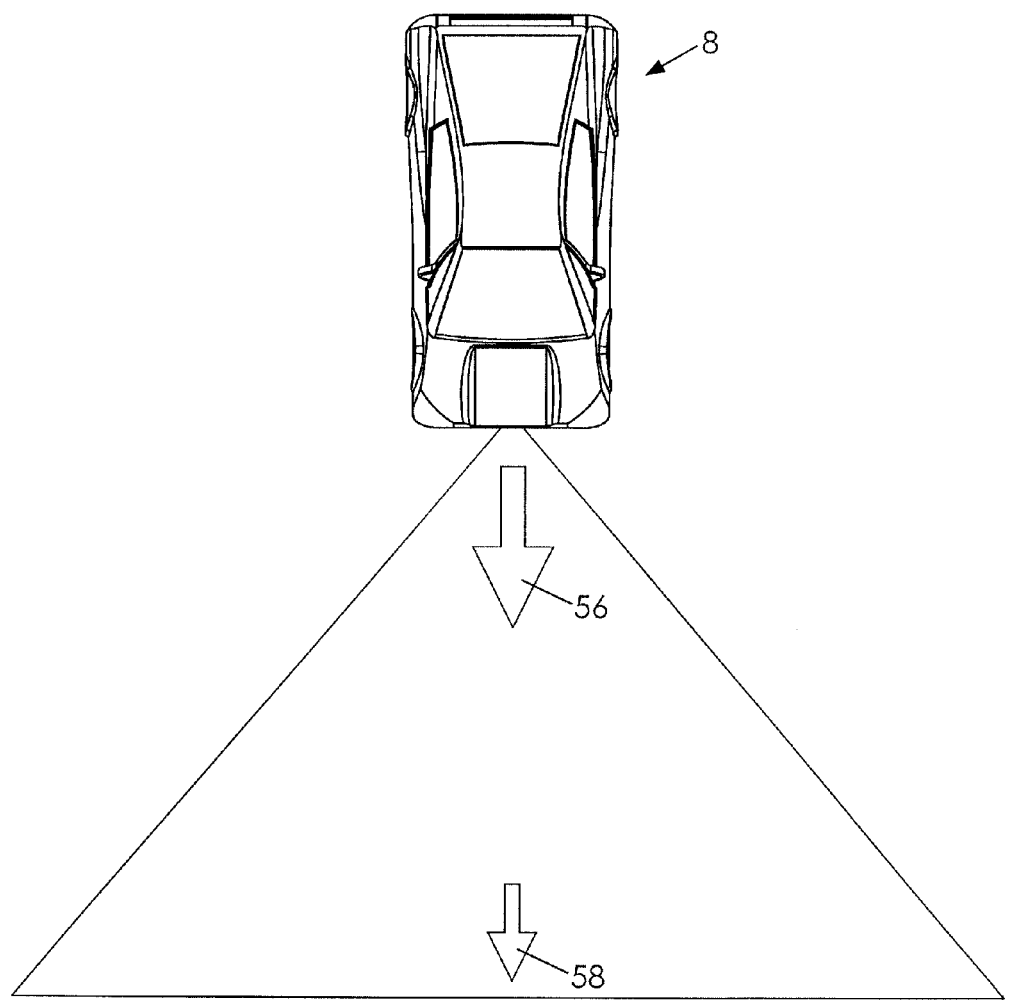
FIG. 2 is a plan view of the projection system in operation.
Figure 3:
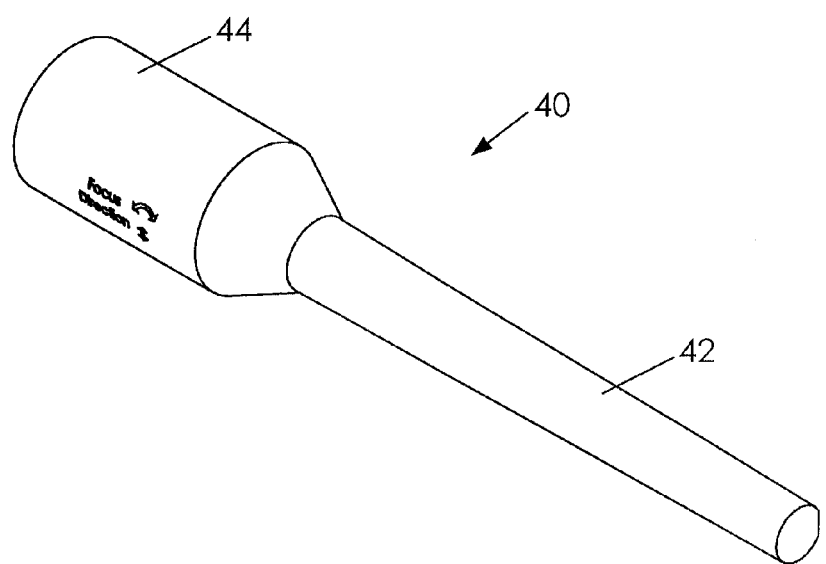
FIG. 3 is a perspective view of a driver input member according to the projector system.

An external projection system according to a preferred embodiment of the present invention will now be described with reference to FIGS. 1 to 6 of the accompanying drawings. The external projection system 10 is configured for use with an automobile 8 and includes first 20 and second 30 projectors mounted to an exterior of the automobile 8 and an input member 40 mounted inside the automobile 8 that is configured to selectively control movement and operation of the first 20 and second 30 projectors. The system 10 may be powered by connection to the automobile's battery or by an auxiliary battery.

The external projection system 10 includes a mounting framework 12 that may be coupled to an external front portion of the automobile. More particularly, the mounting framework 12 may include structures that may be mounted to the grill of the automobile 8 or beneath a front bumper the automobile 8. In any case, it is preferred that the mounting framework 12 be coupled to a front portion of the automobile 8. The first projector 20 may be mounted to the mounting framework 12 and configured directionally to project an image forwardly away from the automobile 8 as will be further described below. Similarly, the second projector 30 may be mounted to the mounting framework 12 and configured directionally to project an image forwardly away from the automobile 8.

Figure 4A:
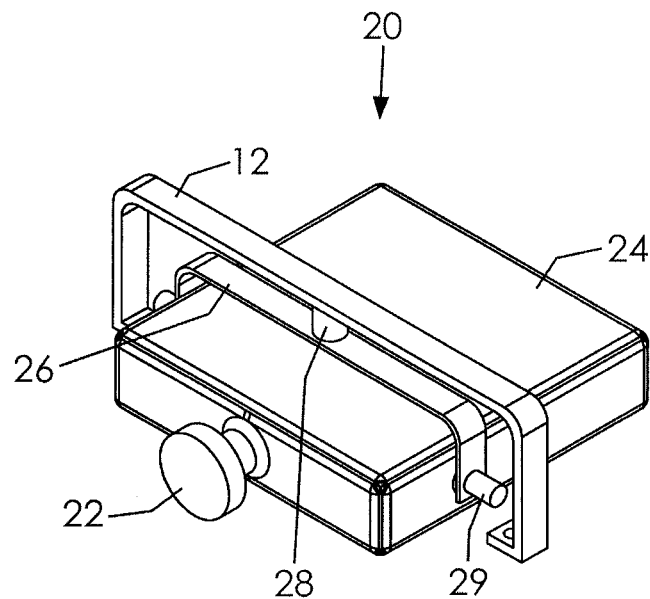
FIG. 4a is a perspective view of a first projector according to the projector system.
Figure 4B:
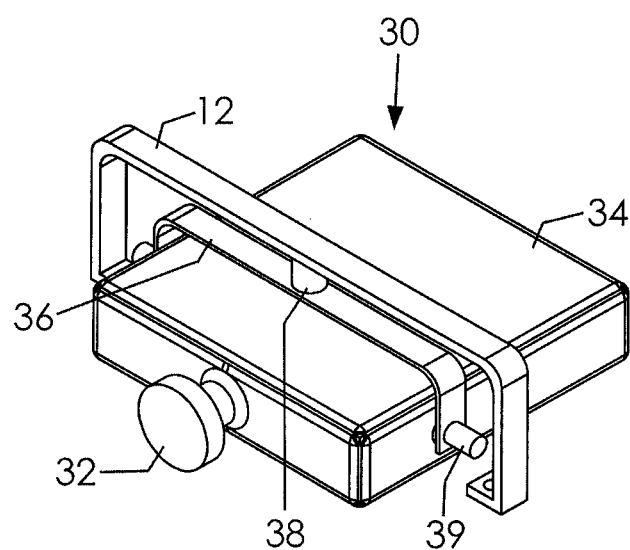
FIG. 4b is a perspective view of a second projector according to the projector system.
Figure 5:
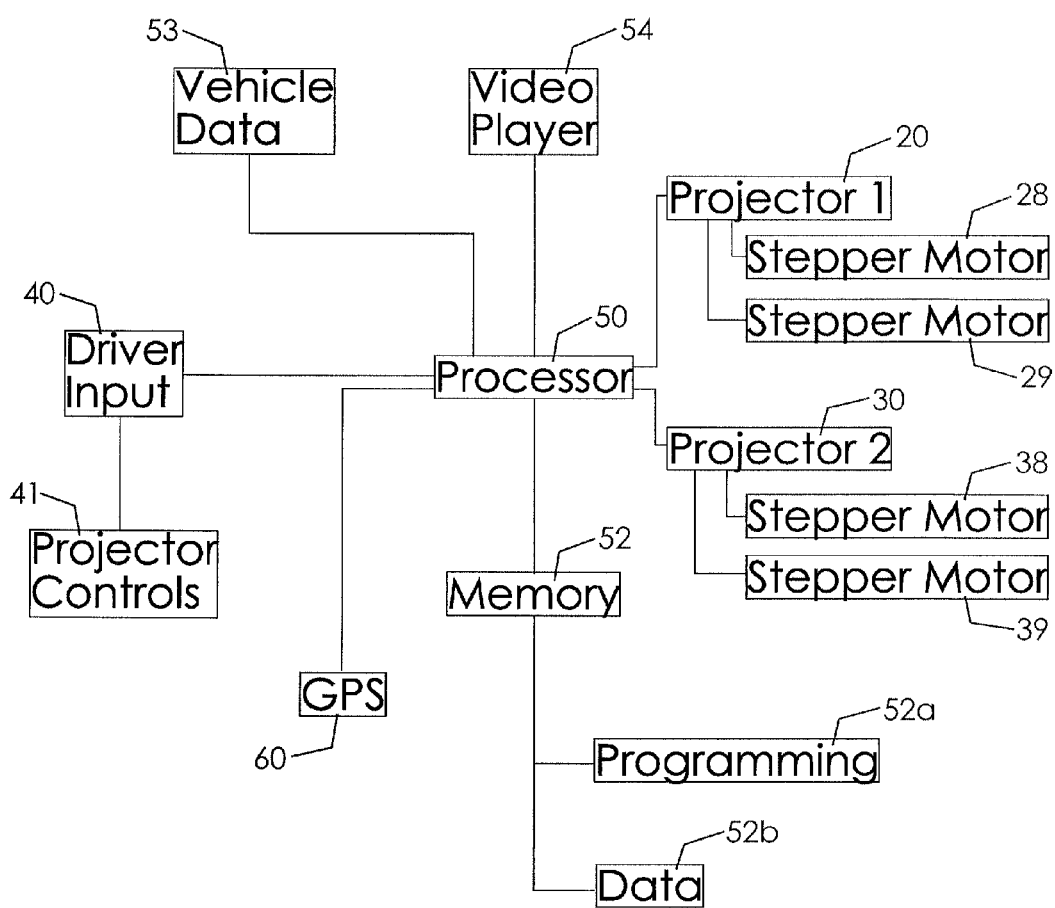
FIG. 5 is a block diagram illustrating the electronic components of the present invention.

Each projector 20, 30 has a substantially similar construction as shown in FIGS. 4a and 4b, including a projection lens 22, 32, respectively, and a housing 24, 34, respectively. Each projector 20, 30 further includes a first stepper motor 28, 38, respectively, positioned atop a respective housing 24, 34 and configured to enable a respective housing 24, 34 to be "panned" or moved rotationally from side to side relative to an imaginary vertical axis when actuated by input member 40 as will be described further later. Each projector 20, 30 may also include a second stepper motor 29, 39 coupled to a respective housing 24, 34 and configured to enable the housing 24, 34 to be tilted or selectively "stepped down" under programming control relative to an imaginary horizontal axis as will be described in greater detail below. Preferably, the stepper motors 28, 38, 29, 39 may be coupled to a bracket 26, 36 that couples the respective housing 24, 34 to the mounting framework 12. Each stepper motor is in data communication with a processor 50 either with wires or wireless communications as will be described below.

The driver input member 40 may be a lever operatively mounted in the interior or cabin of an automobile adjacent other user controls such as the turn signal lever, cruise control buttons, and windshield wiper control. The input member 40 may include a lever portion 42 and a rotatable end portion 44. The rotatable end portion 44 may also be articulated inwardly or outwardly to achieve predetermined functions as will be described below. For instance, the end portion 44 may be rotated so as to focus a lens 22 of a respective projector. Or, the end portion 44 may be pressed inwardly to activate the system 10 in general or pulled outwardly to "flash" the system 10. The lever portion 42 may be moved forwardly or rearwardly to cause the projectors to move laterally in a similar manner. It is understood that lateral movement of the lever causes a projected beam to move laterally relative to a roadway. Together, the components of the input member 40 may be referred to as projector controls 41.

The projection system 10 may include a processor 50 electrically connected to the input member 40, such as with wires or with wireless components. A memory 52 component is preferably electrically connected to the processor 50, the memory 52 including programming 52a that when executed by the processor 50 causes the processor 50 to energize or actuate the projectors 20, 30 to project predetermined images. For instance, indicia such as arrows, pictures, or vehicle data may be stored in appropriate data structures in the memory 52. The memory 52 may also be structured to store data 52b such as current speed data that the processor 50 may obtain from the automobile computer or sensors. It is understood, then, that vehicle data 53 or instrument readings may be the images that are projected onto the roadway to be reviewed by a driver—eliminating the need to look down at the dashboard while driving.

The projection system 10 may include a video player 54, such as a DVD player, that is electrically connected to the processor 50 and indirectly to the input member 40 and at least the first projector 20. When activated, a user may start a video playing in the video player 54 and watch it be projected in front of the vehicle, such as on a garage door, wall, or upon a roadway or parking lot. It is understood that the system 10 may include safety features, such as in the programming, to prevent the video player 54 from operating if the automobile 8 is actually moving.

In one embodiment, the projection system 10 may include a global positioning system ("GPS") 60 or be configured to interface with one. The processor 50, utilizing programming, is configured to receive navigation instructions in real time while driving from the GPS 60 and to then project that data onto the roadway in the same manner as indicia 58 described above. For instance, the GPS 60 may indicate the need for a lane change. The processor 50 may determine when the first 56 and second indicia 58 should be an angled arrow instead of a straight arrow and then actuate the respective projectors to project corresponding indicia accordingly. This type of projection may still be subject to the "step down" process described below.

Figure 6:
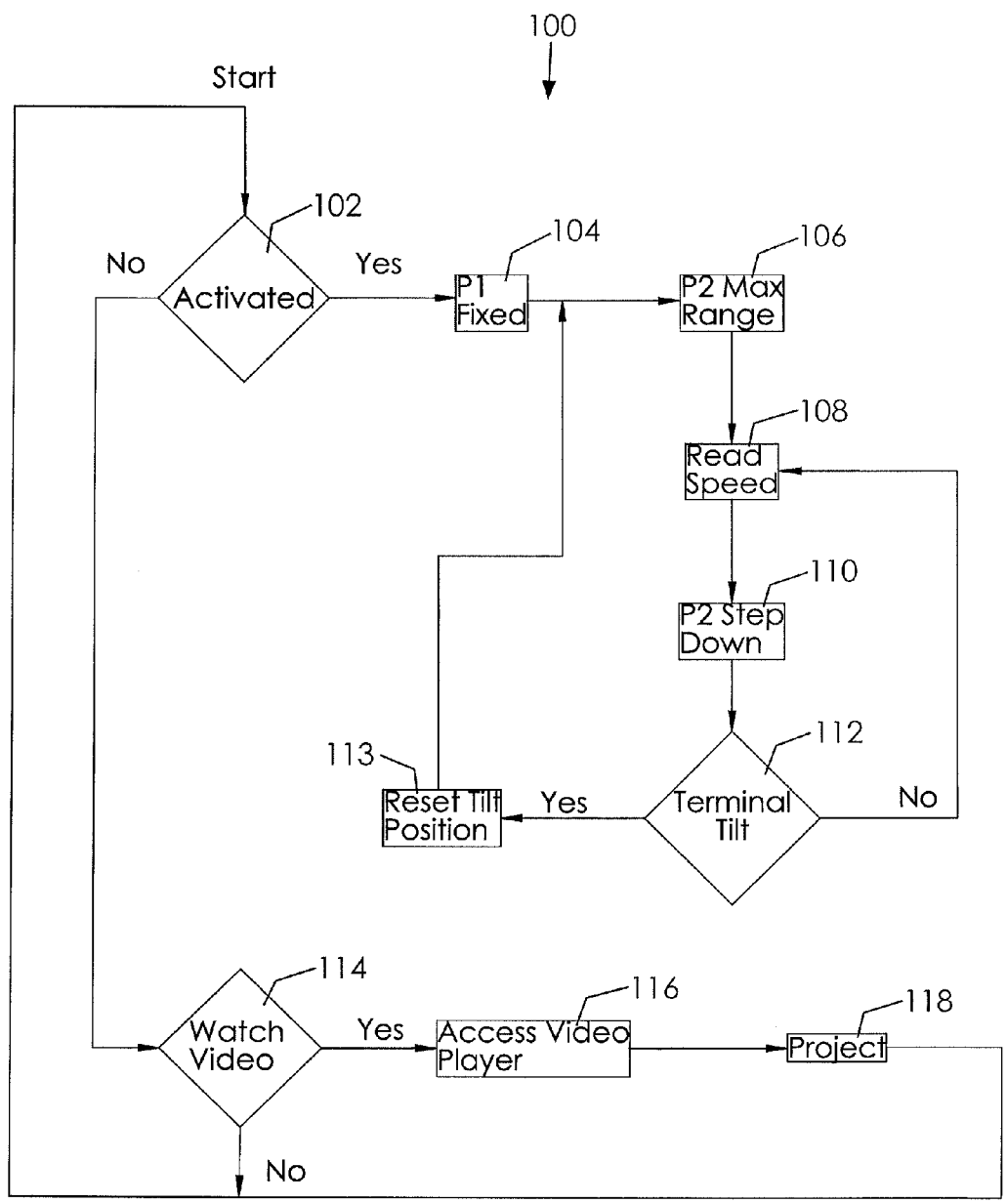
FIG. 6 is a flowchart illustrating the logic of the present invention.

Operation of the projection system 10 by the processor 50 executing programming steps is best understood with reference to the logic diagram of FIG. 6. At step 102, the process 100 determines if the projectors have been activated, such as by a respective operation of the input member 40 by a driver and, if so, the method proceeds to step 104. Otherwise, the process 100 proceeds to step 114. At step 104, the first projector 20 is energized to project a first predetermined indicia 56, such as a large arrow. It is understood that the first projector 20 may be positioned and configured to project the first indicia 56 upon a roadway adjacent the front portion of the automobile so as to be easily visible to a driver. Once the first projector 20 has been actuated, the process 100 proceeds to step 106.

At step 106, the second projector 30 is energized and configured to project a second indicia 58 upon the roadway at its maximum range, such as at the edge of the range of the automobile's headlight beams. The process 100 then proceeds to step 108 where the processor 50, under program control, determines a current speed of the automobile. The current speed may be obtained by accessing data from the automobile's computer or other sensors and the data may be stored in memory 52. The process 100 then proceeds to step 110.

At step 110, the processor 50, under program control, actuates a second projector second stepper motor 39 to tilt the second projector housing 34 downwardly or, stated another way, to "step down" the second projector 30. In one embodiment, the second projector stepper motor 39 may cause the second projector housing 34 to be tilted downwardly a predetermined amount and according to predetermined step frequency data stored in memory 52. In operation, tilting the second projector 30 downwardly causes the second indicia 58 to be projected closer to the front of the automobile and the illusion is that the car is getting closer to the second indicia 58 (which may be an increasingly larger arrow). For instance, the second projector 30 may be projecting the image of an arrow, the second projector housing 34 being tilted downwardly every 2 seconds such that it appears that the arrow is getting closer to the front of the automobile.

In another embodiment, the processor 50 may utilize the current speed data (indicative of a current speed of the automobile) to determine how much or the frequency with which the second projector 30 is stepped down. More particularly, the frequency with which the second projector 30 is stepped down may be increased as the current speed increases; conversely, the frequency with which the second projector 30 is stepped down may be decreased as the current speed decreases. Accordingly, the arrow appears to move from a far away position on the roadway to very close to the automobile at a faster rate during fast driving than during slow driving.

The process 100 then proceeds to step 112. At step 112, the processor 50 determines if the second projector 30 has been completely tilted downwardly to a terminal tilt position i.e., completely "stepped down." If so, then the process 100 proceeds to step 113 where the second projector housing 34 is reset to a predetermined initial step position. After the reset, control is returned to step 106 where the indicia projected by the second projector 30 is again displayed at maximum range and the step down process begins again.

If the terminal tilt position was not found to be reached at step 112, then the process 100 returns to step 108 where the speed is determined, the second projector housing 34 and is again stepped down according to step frequency data as described above. It is understood that movement of the second projector to the terminal tilt position and reset to the initial tilt position may occur repeatedly at a rapid frequency as the vehicle is traveling at a high rate of speed. Otherwise, the process 100 proceeds to step 102 and the entire process 100 is started again. In such case, the second projector 30 will again project its second indicia 58 at its predetermined maximum range.

It is understood that the projection process including the step-down process may be terminated by a user using the input member 40. If the projectors 20, 30 are not activated at step 102 or have been terminated, the process 100 proceeds to step 114 and the processor 50 determines if the video player 54 has been activated. If so, the process 100 proceeds to step 116; otherwise, control is returned to step 102. At step 116, the video player 54 is accessed and a video placed therein may be started. The process 100 then proceeds to step 118 and video is projected. For instance, a DVD may be projected by the first projector 20 upon an external screen, wall, garage door or the like.

It is understood that while certain forms of this invention have been illustrated and described, it is not limited thereto except insofar as such limitations are included in the following claims and allowable functional equivalents thereof.

The invention claimed is:

1. A projection system for use with an automobile and a global positioning system ("GPS"), comprising:

a mounting framework selectively coupled to an exterior of the automobile;

a first projector coupled to said mounting framework and positioned to project digital images forwardly of the automobile;

a processor in data communication with said first projector and the GPS;

a memory in data communication with said processor and that has data structures configured to store digital image data and programming;

programming in said memory that when executed by said processor causes said processor to energize said first projector to selectively project a predetermined image stored in said memory upon a road surface forward of the automobile;

wherein said first projector includes:
   a first projector housing selectively coupled to said mounting framework, said first projector being situated in said first projector housing;
   a first projector lens extending forwardly from said first projector housing;
   a first projector first stepper motor electrically connected to said processor and operatively coupled to said first projector housing, said first projector stepper motor being configured to selectively rotate said first projector housing about an imaginary vertical axis when actuated by said processor; and
   a first projector second stepper motor electrically connected to said processor and coupled to said first projector housing, said first projector second stepper motor configured to selectively tilt said first projector housing about an imaginary horizontal axis when actuated by said processor.

2. The projection system as in claim 1, further comprising:
an input member situated in an interior cabin of the automobile that is electrically connected to said processor; and
programming in said memory that, when executed by said processor, causes said processor to selectively energize said first stepper motor and said second stepper motor, respectively, according to input data received from said input member, whereby to selectively adjust a position of said first projector housing.

3. The projection system as in claim 2, wherein said input member includes:
   a lever portion that is selectively movable forwardly and rearwardly; and
   a rotatable end portion that is selectively rotatable and selectively articulated forwardly and rearwardly.

4. The projection system as in claim 3, further comprising:
programming in said memory that, when executed by said processor, causes said processor to actuate said first stepper motor to rotate said first projector housing according to a corresponding movement of said lever portion of said input member;
programming in said memory that, when executed by said processor, causes said processor to actuate said lens of said first projector to focus according a respective rotation of said rotatable end of said input member.

5. The projection system as in claim 3, further comprising:
programming in said memory that, when executed by said processor, causes said processor to obtain vehicle instrument data from a computer of the automobile; and
programming in said memory that, when executed by said processor, causes said processor actuate said first projector to display said obtained vehicle instrument data forwardly of the vehicle.

6. The projection system as in claim 1, further comprising:
   a digital video disc (DVD) player in data communication with said processor; and
   programming in said memory that when executed by said processor causes said processor to energize said first projector to selectively project video data from said DVD upon a roadway forward of the automobile.

7. The projection system as in claim 1, further comprising a second projector coupled to said mounting framework and positioned to project digital images forwardly of the automobile; wherein said second projector includes:
   a second projector housing selectively coupled to said mounting framework, said second projector being situated in said second projector housing;
   a second projector lens extending forwardly from said first projector housing;
   a second projector first stepper motor electrically connected to said processor and operatively coupled to said second projector housing, said second projector first stepper motor being configured to selectively rotate said second projector housing about an imaginary vertical axis when actuated by said processor; and
   a second projector second stepper motor electrically connected to said processor and coupled to said second projector housing, said second projector second stepper motor configured to selectively tilt said second projector housing about an imaginary horizontal axis when actuated by said processor.

8. The projection system as in claim 1, further comprising programming in said memory that when executed by said processor causes said processor to energize said second projector second stepper motor to tilt said second projector housing downwardly a predetermined amount at predetermined time intervals indicated by step frequency data.

9. The projection system as in claim 8, further comprising:
   programming in said memory that when executed by said processor causes said processor to obtain current speed data from a computer associated with the automobile; and
   programming in said memory that when executed by said processor causes said processor to modify said step frequency data according to said current speed data.

10. The projection system as in claim 9, wherein said programming to modify said step frequency data according to said current speed data includes:
   programming that increases said step frequency data when said current speed data increases; and
   programming that decreases said step frequency data when said current speed data decreases.

11. The projection system as in claim 10, further comprising:
   programming in said memory that, when executed by said processor, causes said processor to obtain GPS data from the GPS; and
   programming in said memory that, when executed by said processor, causes said processor to actuate said first projector to display said obtained GPS data forwardly of the vehicle.

12. The projection system as in claim 8, further comprising programming in said memory that when executed by said processor causes said processor to actuate said second projector second stepper motor to reset said second projector housing to a predetermined initial tilt position when said second projector second stepper motor has reached a terminal tilt position.

13. The projection system as in claim 1, further comprising:

programming in said memory that, when executed by said processor, causes said processor to obtain GPS data from the GPS; and programming in said memory that, when executed by said processor, causes said processor to actuate said first projector to display said obtained GPS data forwardly of the vehicle.

* * * * *